US006500776B2

(12) United States Patent
Hamada et al.

(10) Patent No.: US 6,500,776 B2
(45) Date of Patent: Dec. 31, 2002

(54) BLANKET SUBSTRATE AND BLANKET

(75) Inventors: Toshihiro Hamada, Tokyo (JP); Nobuyoshi Takai, Tokyo (JP); Kunihiro Shiraki, Osaka-Pref (JP); Tomokazu Ise, Okayama-Pref. (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/305,467

(22) Filed: May 6, 1999

(65) Prior Publication Data

US 2002/0098758 A1 Jul. 25, 2002

(30) Foreign Application Priority Data

May 6, 1998 (JP) .......................................... 10-123215
Mar. 30, 1999 (JP) .......................................... 11-088358

(51) Int. Cl.$^{7}$ .......................... D03D 15/00; B32B 25/10

(52) U.S. Cl. ....................... 442/192; 442/189; 442/293; 428/909

(58) Field of Search ................................ 428/397, 399, 428/400, 909; 442/189, 195, 192, 293

(56) References Cited

U.S. PATENT DOCUMENTS 4,048,368 A 9/1977 Hale et al.

FOREIGN PATENT DOCUMENTS

| | | |
|---|---|---|
| EP | 0 438 780 | 7/1991 |
| JP | 47-32908 | 11/1972 |
| JP | 62-282986 | 12/1987 |
| JP | 63-249696 | 10/1988 |
| JP | 6-297877 | 10/1994 |

OTHER PUBLICATIONS

JP 47–32908 Toshio Nov. 16, 1972. (English Translation).*

Patent Abstracts of Japan, vol. 12, No. 169 (M–699), May 20, 1988, JP 62–282786, Dec. 8, 1987.

* cited by examiner

*Primary Examiner*—Terrel Morris
*Assistant Examiner*—Jenna-Leigh Befumo
(74) *Attorney, Agent, or Firm*—Oblon, Spivak, McClelland, Maier & Neustadt, P.C.

(57) ABSTRACT

A blanket substrate comprising spun yarn of polyvinyl alcohol based fibers, in which the fibers have primary ridged streaks which are formed on their surfaces in the direction of the fiber axis with finer secondary ridged steaks formed in the primary ridged streaks, the fibers having a cross-section circularity of at least 80%.

12 Claims, 1 Drawing Sheet

BLANKET SUBSTRATE AND BLANKET

BACKGROUND OF THE INVENTION

1. Field of the Invention

The present invention relates to a blanket substrate and a blanket, having the substrate, for offset printing, etc.

2. Description of the Background

A blanket, formed as a laminate comprising 3 or 4 fabric layers and a rubber layer, and having a smooth rubber layer for contact by ink, has been widely used in the past in offset printing. In order to prepare blankets having good printing characteristics, high-quality blanket substrates must be used. Accordingly, blanket substrates are required to have high-level properties of (1) good dimensional stability with little "elongation", (2) good adhesiveness to rubber layers, and (3) uniform thickness.

Blanket substrates with poor dimensional stability, under the load of machine driving, will elongate. This elongation lowers printing accuracy. In order to ensure the quality of the printed images desired, the "elongated" portion of the substrate must be wound up, which, however, interferes with efficient printing operation. On the other hand, the substrates which have low adhesiveness to rubber layers and the substrates whose thickness is not uniform give uneven prints, which results in unsatisfactory printing accuracy.

In order to prepare substrates which have uniform thickness and good adhesiveness to other layers, high-quality yarn of Egyptian cotton has been widely used, which, however, is problematic, because the use of this cotton for production of the substrates requires particular treatment with wet heat in order to enhance the dimensional stability of the substrates. In addition, even after the treatment, the dimensional stability of the substrates is lowered when they are again wetted. As a result, in repeated offset printing, blankets having a substrate are elongated whenever they are pressed against rolls and wetted. If the degree of "elongation" is too large, the blankets must be re-tightened, for which the printing operation must be stopped. In addition, the "elongation" changes the thickness of the blankets, which change results in non-uniformity of blanket thickness. The maintenance of the blankets requires much labor. Blankets, if not maintained well, will have poor printing characteristics.

Given this situation, polyvinyl alcohol (PVA) fibers having good dimensional stability and having high affinity for rubber have been proposed as blanket substrates (see JP 47-32908 and JP 62-282986). However, since ordinary PVA based fibers have a cocoon-like cross section, blanket substrates comprising them are problematic, because they often do not have uniform thickness, and, in addition, when used for a long period of time, they often lose "resistance of cycle compression" and their capabilities become unsatisfactory.

Specifically, JP 47-32908 proposes using spun yarn prepared from PVA based fibers in order to prevent the elongation of blankets. However, the fibers constituting the spun yarn exhibit "interfiber slips" when a mechanical load is applied thereto. After all, therefore, even though high-strength fibers having a high modulus of elasticity are used for substrates, "elongation" of the substrates comprising them is inevitable.

On the other hand, JP 62-282986 proposes the use of high strength, low-elongation PVA filament yarn for blanket substrates. In the proposed method disclosed, the substrates produced will not elongate very much, but their adhesiveness to other layers is low because the surface of the filament yarn from which the substrate is prepared has no nap. Therefore, these substrates do not ensure satisfactory printing accuracy.

In order to solve the problems noted above, the use of core yarn prepared by applying short fibers onto the surf ace of synthetic filaments or long staple fibers having a length of from 10–30 cm has been proposed for blanket substrates (see JP 63-249696 and 6-297877). These disclosures state that the core of the core yarn prevents the "elongation" of the blanket substrates comprising the core yarn, and that the short fibers on the surface of the core improve the adhesiveness of the substrates to other layers. In practice, however, it is difficult to produce homogeneous, high-quality core yarn. Therefore, the substrates comprising core yarn are still problematic, because their thicknesses will not be uniform. In addition, since the short fibers which exist on the surface of the core will have "interfiber slips", the dimensional stability of the substrates cannot be improved to a satisfactory degree. A need, therefore, continues to exist for an improved substrate for blankets used in printing operations.

SUMMARY OF THE INVENTION

Accordingly, one object of the present invention is to provide a blanket substrate which has the properties of good dimensional stability, uniform thickness, resistance to cyclic compression and good adhesiveness to rubber.

Another object of the invention is to provide a blanket which is comprised of the substrate.

Briefly, these objects and other objects of the present invention as hereinafter will become more readily apparent can be attained by a substrate for a blanket which comprises a spun yarn of polyvinyl alcohol based fibers, wherein the fibers have primary ridged streaks which are formed on their surf ace in the direction of the fiber axis with finer secondary ridged steaks formed in the primary ridged streaks, and have a cross-section circularity of at least 80%.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein.

DETAILED DESCRIPTION OF THE PREFERRED EMBODIMENTS

Figure 1:
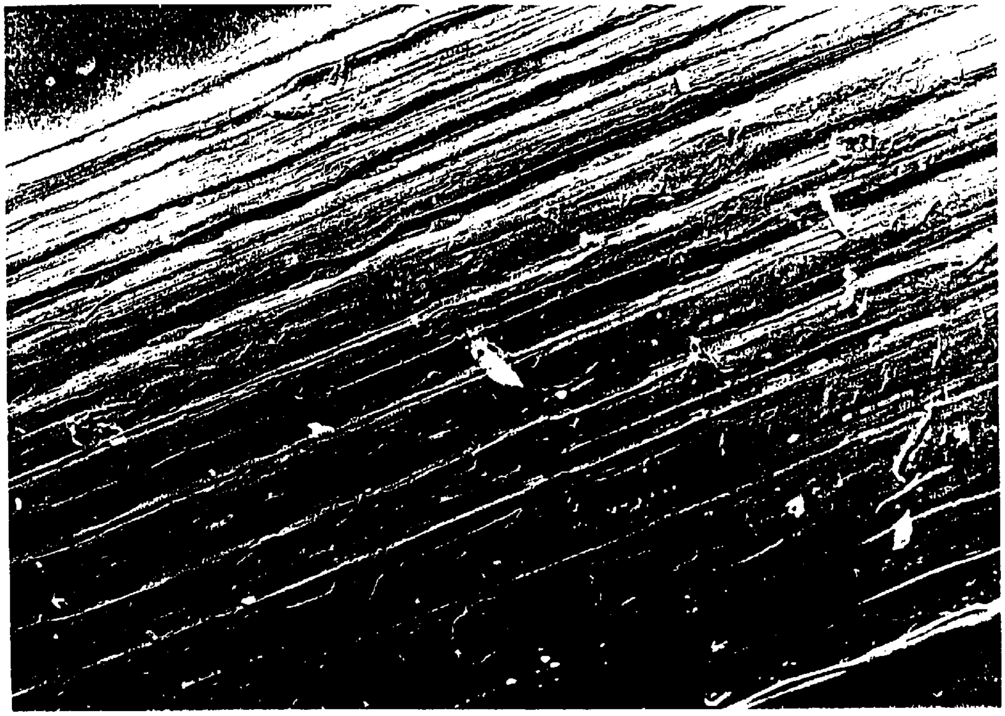
FIG. 1 is an electromicroscopic picture (×10,000) showing the surface structure of an embodiment of the fibers for use in the invention.

The present invention is noteworthy by the use of yarn which is spun from specific PVA based fibers for the construction of a substrate for a blanket. In general, substrates comprising spun yarn can exhibit a high adhesiveness to rubber layers, but are problematic in that the short fibers constituting the spun yarn exhibit interfiber slip which lowers the dimensional stability of the substrates. If blankets are elongated during actual use in printing operations, they must be re-tightened, which operation requires cessation of the printing operation. In addition, the "elongation" changes the thickness of the blankets such that they become non-uniform in thickness, thereby lowering printing accuracy during the intended use of the blankets. Accordingly, the maintenance of the blankets requires much labor. Moreover, if the blankets become deformed while in use in printing operations, good prints cannot be obtained.

The invention is based on the finding that yarn spun from fibers having a specific surface structure is almost free from interfiber slips and that a substrate comprising the spun yarn has good dimensional stability.

Specifically, in the present invention, PVA based fibers are used which have primary ridged streaks on their surface in the direction of the fiber axis and have finer secondary ridged steaks formed in the primary ridged streaks (see FIG. 1). Because of the presence of these streaks on their surfaces, the PVA based fibers are effectively prevented from having interfiber slips, and the dimensional stability of the substrate comprising the fibers is remarkably improved. In general, it is said that fibers having a high cross-section circularity have poor adhesiveness to other layers. However, as having the specific ridged structure on their surface, the adhesiveness of the PVA based fibers for use in the invention to rubber layers is remarkably improved even though the fibers have a high cross section circularity.

From the viewpoint of dimensional stability, uniform thickness, the ability not to lose resistance of cyclic compression, and the adhesiveness of the blanket substrate, it is desirable that the primary ridged streaks on the surf aces of the PVA based fibers constituting the substrate have a width ranging from 0.1–2 μm, a depth (height) ranging from 0.05–0.4 μm and a length of at least 5 μm, more preferably have a width ranging from 0.1–1 μm, a depth (height) ranging from 0.07–0.3 μm and a length ranging from 10–300 μm.

For the same reasons stated above, it is also desirable that the secondary ridged streaks on the surface of the PVA based fibers have a width ranging from 0.01–0.05 μm, a depth (height) ranging from 0.01–0.05 μm and a length of at least 0.01 μm.

From the viewpoint of uniformity of thickness and the ability not to lose resistance of cyclic compression of the substrate, the PVA based fibers constituting the substrate must have a cross-section circularity of at least 80%, preferably from 90–100%. The substrate comprising the fibers having such a high cross-section circularity are ready to have a uniform thickness, and, in particular, it is easy to apply uniform pressure thereto. Therefore, even when a blanket having the substrate is used in printing for a long period of time, it may well keep its resistance of cycle compression, and its printing characteristics and even durability are good. Fibers having a small cross-section circularity are unfavorable, since blanket substrates having them are often not uniform in thickness even through their adhesiveness to other layers can be high. It is desirable that the cross-sectional profile of the PVA based fibers be circular, more preferably, substantially completely round, since the substrate comprised of the fibers should be uniform in thickness and since uniform pressure should be applied to the substrate blanket to ensure good printing capabilities of the blanket with ease. In general, blankets comprised of fibers with a higher cross-section circularity are often problematic in that their adhesiveness to other layers is poor. However, in the invention, the fibers which are used have fine ridged streaks on their surfaces and, therefore, substrates comprising the fibers have good adhesiveness to rubber.

The cross-sectional circularity of fibers of the invention have a value of B/A×100, wherein A is the area of the minimum circumscribed circle around the cross-section of the fiber, and B is the area of the cross-section of the fiber.

The single fiber denier of the PVA based fibers for use in the invention is not specifically defined, but preferably ranges from 0.1 and 20 d or so. In view of the spinning step employed in the preparation of the fibers, thickness uniformity and adhesiveness to other layers of the blanket substrate comprising the fibers, it is more desirable that the single fiber have a fineness ranging from 0.5–3 d or so. In view of the durability and the dimensional stability of the blanket substrate, it is also desirable that the single fiber strength is at least 8 g/d, more preferably at least 10 g/d, even more preferably at least 12 g/d, and that the Young's modulus of the fibers be at least 180 g/d, more preferably at least 200 g/d, even more preferably at least 250 g/d. The uppermost limit of the fiber strength and that of the Young's modulus are not specifically defined. In general, however, the fiber strength may be at most 30 g/d, and the Young's modulus may be at most 500 g/d. For the same reasons as above, it is desirable that the elongation at break of the fibers range from 2–8% or so.

The method employed for the production of the PVA based fibers for use in the invention is not specifically limited. One preferred method comprises wet-jetting a spinning solution, prepared by adding PVA to an organic solvent, into a coagulation bath. One preferred embodiment of this method is mentioned below.

It is desirable that the PVA employed has a mean degree of polymerization, as obtained by a viscosity method in an aqueous solution at 30° C., of at least 500. PVA of this type is ready to give PVA based fibers having a high strength and a high modulus of elasticity. Especially preferred is PVA having a viscosity-average degree of polymerization of at least 1000, preferably at least 1500, as such are capable of more readily giving high-strength PVA based fibers. In view of cost, it is preferably 5,000 or less.

The saponification degree of PVA to be used is not also specifically defined. However, in view of the heat resistance and of the mechanical properties of the PVA based fibers to be produced, it is desirable that the PVA have a saponification degree of at least 98.5 mol. %, preferably from 99.0–100 mol. %. The PVA based fibers produced should have good durability and good dimensional stability even under severe conditions. The vinyl alcohol-based polymers which are used may be copolymerized with any other monomers. However, in order not to interfere with the properties of PVA, the copolymerization rate is preferably at most 10 mol. %, more preferably at most 2 mol. %. The PVA based fibers may contain any other components (polymers, etc.) except vinyl alcohol-based polymers, so far as the additional components do not interfere with the effect of the invention.

The solvent which is used for fiber production is not particularly limited, and any and every organic solvent capable of dissolving PVA may be used. Solvents include, for example, polar solvents such as dimethylsulfoxide (DMSO), dimethylformamide, dimethylimidazolidine, and the like, and polyhydric alcohols such as glycerin, ethylene glycol, and the like. Mixtures of two or more of these solvents and even mixtures of the solvent with water may also be used. Of the many possible solvents, DMSO is preferred, since it is able to dissolve PVA at relatively low temperatures without thermally deteriorating and coloring the resulting PVA solution.

The PVA concentration in the spinning solution varies, depending on the degree of polymerization of PVA and the type of solvent used. In general, it may range from 2–30% by weight, preferably from 3–20% by weight.

The spinning solution used in the invention may contain various additives, in addition to PVA and the solvent. The additives include, for example, surfactants, anti-oxidants, pH-controlling agents such acids, gellation promoters such as boric acid, and the like. A predetermined amount of any of these additives may be added to the spinning solution. Where DMSO or the like having a relatively high freezing point is used as the solvent, methanol or the like having a coagulating ability can be added to the spinning solution within the range which does not coagulate the PVA in the solution. Adding methanol or the like to the spinning solution within such a range is preferred, as the solution is protected from freezing because of the freezing point-depressing effect of methanol or the like added thereto, even when the temperature of the coagulation bath used for spinning the solution is lower than the freezing point of the solvent. The spinning solution may be jetted out into the coagulation bath through nozzles having a desired diameter.

The coagulation bath comprises an organic solvent which has the ability to coagulate PVA. The solvent is not specifically limited, and any and every solvent having the ability to coagulate PVA may be used. Such coagulating solvents include, for example, alcohols such as methanol, ethanol, and the like, and ketones such as acetone, methyl ethyl ketone, and the like. Of these solvents, preferred is methanol, as it is inexpensive and its coagulating ability is relatively mild enough to easily form uniform and fine crystal structures. The organic solvent may be combined with an inorganic salt such as calcium chloride, sodium rhodanide, or the like. However, in view of the mechanical properties of the fibers which are to be produced, it is desirable that the solvent of the spinning solution be incorporated in the coagulation bath. The solvent content of the spinning solution of the coagulation bath varies, depending on the solvent having coagulation capabilities, but preferably ranges from 5–70% by weight. The bath provides a uniform gel by mild coagulation therein. More preferably, the solvent content of the bath ranges from 10–50% by weight, more preferably from 14–45% by weight.

In order to produce fibers having a high strength and a high modulus of elasticity, it is desirable that the temperature of the coagulation bath be not higher than 20° C., preferably not higher than 15° C., more preferably from 0–10° C.

The spinning method for producing the PVA based fibers for use in the invention must be a wet-spinning method in which the nozzle is kept in direct contact with the coagulation bath. Any other dry/wet-spinning method or gel-spinning method in which the nozzle is spaced from the coagulation bath via an air gap layer therebetween is not employable herein, since the surface of the fibers produced therein would not have the desired ridged structure. Specifically, in a dry/wet-spinning method or gel-spinning method, secondary ridged streaks can be formed on the surface of the fibers produced, but primary ridged streaks having a larger structure cannot be formed thereon. The fibers not having primary ridged streaks will often have interfiber slips, and substrates comprising them cannot have good adhesiveness to other layers and, therefore, their properties including durability are poor.

The reason why the structure of the fiber surface varies, depending on the spinning method employed, is not as yet clear. At least at present, it is believed that, in the wet-spinning method, the spinning solution, having been jetted out through the nozzle into the coagulation bath, is immediately solidified, and, as a result, the viscoelastic condition of the spinning solution just before being jetted out through the nozzle can be directly transferred to the surface of the solidified fibers, thereby making the fibers have specific ridged streaks on their surfaces. On the other hand, it is believed that, in the dry/wet-spinning method and the gel-spinning method, the spinning solution is jetted out through the nozzle into the air gap layer between the nozzle and the coagulation bath, in which the solidification rate of the jetted solution is small, and, as a result, the solution is solidified after the viscoelastic condition of the solution has been attenuated in some degree and, therefore, the solidified fibers cannot have specific ridged streaks on their surfaces. Specifically, it is believed that the reason for the significant difference in the surface structure between the fibers as produced in the wet-spinning method and those as produced in the dry/wet-spinning method (or in the gel-spinning method) is that, in the wet-spinning method, the fibers produced are relaxed after solidification of their surfaces, since the solidification rate of the surface of the polymer flow just after having been jetted out through the nozzle is extremely high, while, in the dry/wet-spinning method, the fibers produced are first relaxed and then they solidify.

Next, the fibers having been solidified in the coagulate on bath are removed therefrom, and it is desirable to remove the solvent and other materials from the solidified fibers through extraction washing. As to the extraction bath which is used to remove solvent, a preferred organic solvent is one which has coagulation capabilities. Next, a desired oiling agent is applied to the thus-washed fibers, which are then dried. In order to prevent the fibers from sticking together, the fibers should desirably be wet-drawn in one or more stages in any desired step before the drying step. Preferably, the wet-drawing magnification ranges from 2.5 and 5.5.

It is desirable that the thus-obtained fibers, which are to be spun into yarn, are drawn under heat at high temperature for orientation and crystallization, thereby imparting high strength and a high modulus of elasticity to the fibers. The thus-processed fibers do not stick together and, therefore, have high thermal drawability. Accordingly, they may be drawn with ease to a high degree of magnification into high-strength, high-modulus fibers.

The thermal drawing system employed herein is not specifically limited, and may use any non-contact or contact heater, hot air furnace, oil bath, high-temperature water vapor, or the like. The thermal drawing may be effected in two or more stages, for which the temperature is controlled in plural stages. Preferably, the drawing temperature is not less than 210° C., more preferably ranging from 220–250° C. Also preferably, the total drawing magnification ranges from 8–26, more preferably from 10–24. After having been thermally drawn, the fibers may be optionally processed with an oiling agent. If desired, they may be further processed in order to cross-link the hydroxyl groups therein.

Observing the surface of the fibers as obtained in the manner described above, in a replica of the method described below, the fibers are seen to have, on their surface, a microscopic double-ridged structure which comprises relatively large primary ridged streaks running continuously in the direction of the fiber axis, and secondary ridged streaks definitely smaller than the primary streaks.

In the invention, the PVA based fibers must be spun into yarn. In place of spun yarn, if filament yarn or core yarn of fibers is used as the essential component for the production of the blanket substrates, the resulting substrates likely will not exhibit good adhesiveness to other layers and likely will not exhibit uniform thickness and, therefore, they will not achieve the objectives of the invention. Needless-to-say, the spun yarn may be combined with any other yarn (filament, core yarn, or the like) within a range which does not interfere with the effect of the invention, but it is more desirable that the substrate of the invention be substantially composed of spun yarn only.

In the invention, the spun yarn for the substrate is of specific PVA based fibers as described above. Therefore, the substrate composed of the spun yarn should exhibit good adhesiveness to other layers, and, in addition, they should have good dimensional stability and should be uniform in thickness.

In particular, according to the spinning method noted above, in which a spinning solution as prepared by dissolving PVA in a solvent is used, the fibers produced exhibit little tendency to stick to each other. Therefore, the fibers can be efficiently spun into yarn of high quality, and the blanket substrates composed of the spun yarn exhibit the very excellent properties of good adhesiveness to other layers, good mechanical characteristics and good dimensional stability.

Specifically, in order to obtain spun yarn of high quality, the fibers must be homogeneously carded in the carding step in the spinning process, and it is important that the short fibers which are in aggregate do not stick together. PVA based fibers, as produced in a conventional wet-spinning method in which, for example, an aqueous solution of PVA is jetted into Glauber's salt or the like, are likely to stick together in the drying step and, therefore, cannot be spun into yarn of high quality. Spun yarn of such conventional PVA based fibers cannot achieve the effects of the present invention.

The method of spinning the specific PVA based fibers into yarn for use in the invention is not specifically limited. One preferred example of the spinning method is as follows: The fibers are previously crimped in a crimping step, then cut into pieces having a length of from 10–80 mm or so. The resulting fiber aggregates which are ready for spinning are spun in a spinning system like that employed for the spinning of cotton, into the intended spun yarn. In this process of producing the spun yarn, any other fibers, except the specific PVA based fibers, may be combined with the specific PVA based fibers within a range which does not interfere with the effect of the invention. In order to efficiently attain the effect of the invention, it is desirable that the proportion of the specific PVA based fibers in the spun yarn be at least 50% by weight, more preferably at least 80% by weight, even more preferably at least 90% by weight. Most preferably, the spun yarn is 100% by weight of the specific PVA based fibers.

The thickness of the spun yarn may be suitably determined. For example, the spun yarn may have a yarn count number ranging from #10 to #80. For example, #20 spun yarn of the PVA based fibers of the invention may have a yarn quality (this is represented by U %) of 9% or so, and this is comparable to high-quality, Egyptian cotton spun yarn. The PVA based fibers of the invention may be spun into #50 or higher spun yarn, although spinning conventional PVA based fibers into such yarn is difficult. The blanket substrate that comprises at least partly the spun yarn of such type is excellent, since it has much better-dimensional stability and adhesiveness to other layers, and since it is much more uniform in thickness. It is not always necessary that the fabric for the substrate be exclusively composed of spun yarn having the same yarn count. In view of the uniformity of thickness, however, it is desirable that the weft or the warp of the fabric is of spun yarn having substantially the same yarn count (within the range of the ratio, largest yarn count/smallest yarn count $\leqq 1.1$).

For the purpose of reducing the weaving shrinkage of the warp, it is desirable that the yarn count of the spun yarn for the warp be larger than that of the spun yarn for the weft. Specifically, it is desirable to satisfy the relationship of: (yarn count of the spun yarn for the weft)$\times 3 \geqq$(yarn count of the spun yarn for the warp)$\geqq$(yarn count of the spun yarn for the weft). If desired, twist yarn composed of from 2–10 spun yarns may be woven into the fabric for the substrate.

In view of the dimensional stability and the durability of the blanket substrate, it is desirable that the strength of the spun yarn be at least 4 g/d, and it is also desirable that the degree of elongation of the spun yarn range from 5–12% or so. The uppermost limit of the strength of the spun yarn is not specifically limited, but generally is at most 20 g/d. From the same viewpoint as above, it is desirable that the "U %" of the spun yarn be at most 15%, preferably at most 12%, more preferably from 0–10%.

The spun yarn mentioned above is formed into the fabric for a blanket substrate of the invention. For the substrate, a woven fabric of the spun yarn is suitable, as having better mechanical properties, especially having much better mechanical properties and dimensional stability as selectively is improved in one direction. Above all, the more preferred is plain weaves, in view of their ease of production and of the mechanical properties of the fabric.

In the invention, it is not always necessary that the blanket substrate be composed of only the specific spun yarn comprising the specific PVA based fibers mentioned above. Any other yarn (spun yarn, filament yarn, etc.) may be combined with the spun yarn comprising the specific PVA based fibers to construct the blanket substrate of the invention, as long as the other yarn does not interfere with the effect of the invention. The fibers of the other yarn include PVA based fibers, except the specific PVA based fibers noted above, polyester fibers, rayon fibers, cotton fibers, and the like. If desired, even twisted yarn composed of the spun yarn comprising the specific PVA based fibers and the other spun yarn may also be used in the invention.

In order to fully ensure the effect of the invention, it is desirable that the warp for the substrate fabric be partly or entirely of the spun yarn comprising the specific PVA based fibers of the invention. It is more desirable that at least 80% by weight of the warp of the fabric, more preferably, substantially the whole of the warp thereof be composed of the spun yarn comprising the specific PVA based fibers of the invention defined herein.

The weft of the fabric is not required to have such high quality, in comparison to the warp. Therefore, from the point of view of obtaining a high-quality blanket substrate, the spun yarn employed for the weft does not have to be entirely the spun yarn prepared from the specific PVA based fibers of the invention. However, in order to more surely attain the effect of the invention, it is desirable that at least 80% by weight, more preferably, substantially the whole of the weft be composed of the spun yarn comprising the specific PVA based fibers of the invention.

The method for producing the substrate of the invention is not specifically limited. The substrate may be produced by any known method. In view of dimensional stability, the resistance of cyclic compression and the printing utility of the substrate, it is desirable that the thickness of the substrate, just before it is laminated with other layers into blankets, fall within the range of 0.1–0.5 mm or so, and that the unit weight thereof fall within the range of 100–300 g/$m^2$ or so. From the viewpoint of dimensional stability and adhesiveness to other layers of the substrate, it is also desirable that the total denier per 1 cm in width in the warp direction be within the range of 5000–15000 d/cm or so, and that the density of the warp fall within the range of 30–130/in.

In order to enhance the dimensional stability of the substrate, the substrate should be subjected to a thermal fixation treatment. One preferred method of thermal fixation comprises stretching the substrate to a degree of at least 5% in the warp direction followed by thermally fixing the substrate at a temperature of 130° C. or higher. The substrate thus having been subjected to thermal fixation in this manner should have much better dimensional stability at high temperatures and at ordinary temperature.

The stretching step removes the structural relaxation of the spun yarn in the fabric, in which the undulations of the yarn oriented in the warp direction are removed in order to straighten the yarn. The most preferred stretching degree varies, depending on the structure of the fabric. The stretching degree should be higher than the degree of weaving shrinkage of the fabric in the warp direction. More preferably, the stretching degree is at least 5%, more preferably at least 10%. However, if the stretching degree is too large above a certain value, the fibers constituting the fabric will have some internal strain and, therefore, shrink. If so, the fibers thus having shrunk will be subjected to the thermal fixation in the next step. In that case, the increase in the shrinking degree will not be more effective. For these reasons, the stretching degree should at most be 20%, preferably at most 15%. The degree of weaving shrinkage as referred to herein is measured according to the ordinary woven fabric test method of method B in JIS-L-1096. Where the "warp direction" of a woven fabric cannot be identified, the direction in which the fabric has the highest tensile strength is recognized as the warp direction of the fabric.

The stretching method which is used in not specifically limited. For example, the woven fabric to be stretched is held by rubber rollers, and the fabric is stretched between them while the rotating rate of the plural rollers applied to the fabric is separately controlled.

As the case may be, the rubber rolls will slide on the raw fabric which is stretched so that the fabric cannot be stretched to the desired stretching degree. In that case, the raw fabric may be previously marked in some points, and the stretching degree may be confirmed from the marked points, and may be controlled, if necessary. Through the stretching treatment, the density of the weft of the stretched fabric decreases, which is an index of the degree of stretching of the fabric.

PVA based fibers have a high modulus and, therefore, fabrics comprising such fibers require a large force for stretching. For example, in order to stretch a fabric of PVA based fibers to a degree of 5%, the force which is needed is at least 1 ton/m. Therefore, when the fabric is stretched to a high degree, the fabric should be treated under dry heat in order to soften the PVA based fibers constituting it. Thereafter, the thus heat-treated fabric is stretched. The fabric having been subjected to such a dry heat treatment can be efficiently stretched, and the stretching treatment does not have any significant influence on the structure of the fibers constituting the fabric. Therefore, the dry heat treatment prior to the stretching treatment is preferred from the point of view of fiber properties and for the resistance of cyclic compression of the blanket substrate. In particular, the dry heat treatment very significantly increases the degree of stress of the stretched fabric in 2% elongation. The stress in 2% elongation varies, depending on the yarn count of the spun yarn constituting the fabric and on the constitution of the fabric. Where fabric having the same constitution is subjected to the same stretching treatment, its properties can be improved by the dry heat treatment.

In order to facilitate the stretching treatment, the temperature for the dry heat treatment should be 100° C. or higher, preferably 150° C. or higher. more preferably 180° C. or higher. However, in order that the properties of the woven fabric not deteriorate, the temperature of the dry heat treatment preferably should not be higher than 230° C. Stretching may be effected after the dry heat treatment, or may be effected simultaneously with it.

Stretching may be effected under wet heat, for example, at 100° C. or higher. However, since PVA based fibers are not softened significantly in hot water, the latent heat of vaporization of water will be the energy loss. Therefore, wet heat stretching is not efficient, but will rather cause interfiber sticking of PVA based fibers by which the fabric of the substrate will lose its flexibility. For these reasons, wet heat stretching is unfavorable.

In order to reduce the shrinkage stress at high temperatures, the thermal fixation treatment should be done at a temperature of not less than 140° C., preferably not less than 160° C. If the dry heat treatment is followed by the stretching treatment and further by the thermal fixation treatment in series, the thermal fixation treatment should be done at a temperature lower by at least 10° C., preferably by at least 20° C., than the temperature of the dry heat treatment, from the point of view of the structural stability and the dimensional stability of the substrate. From the viewpoint of the properties of the substrate, the temperature for the dry heat treatment should not be higher than 230° C., preferably not higher than 200° C. The thermal fixation treatment may be effected in a constant length condition. However, from the viewpoint of dimensional stability, the thermal fixation treatment should be done in a relaxed condition to some degree.

Through the stretching treatment and the thermal fixation treatment, the blanket substrate obtained should exhibit much improved dimensional stability, and its thickness should be more uniform.

From the viewpoint of the dimensional stability of the blanket, the tensile strength at break of the substrate in the warp direction should be at least 4 g/d, preferably at least 5 g/d, more preferably at least 6 g/d, and that the degree of stress of the substrate in 2% elongation in the warp direction be at least 1 g/d, preferably at least 1.1 g/d, more preferably at least 1.2 g/d. The uppermost limit is not specifically limited. In general, however, the tensile strength at break of the substrate in the warp direction is at most 20 g/d, and the degree of stress thereof in 2% elongation in the warp direction is at most 10 g/d.

In order to prevent the dimensional change (shrinkage) in vulcanization which can occur at high temperatures after the lamination of the blanket substrate with a rubber layer, the degree of thermal shrinkage of the substrate at 150° C. in the warp direction should be at most 2%, preferably at most 1%, more preferably at most 0.7%, still more preferably from 0–0.5%. The blanket having the present substrate, which has a small degree of shrinkage, should have substantially better properties. In practical use, the blanket is not elongated, and its thickness does not vary.

The method for producing the blanket of the invention is not specifically limited, insofar as the blanket possesses at least the substrate of the invention.

The blanket is generally composed of a plurality of substrate layers and a surface rubber layer, for which the blanket substrate of the invention may be combined with any other substrate, or the plural substrate layers are all of the substrate of the invention. In view of printing characteristics, the blanket should comprise four substrate layers. Especially, in view of the uniformity in quality of the blanket, the two interlayers are of substrates having substantially the same constitution. In addition, in order to enhance the dimensional stability of the blanket, one outer layer (layer X) to which a rubber layer is adhered should be a substrate made of spun yarn having substantially the same constitution as that of the spun yarn which constitutes the substrate of the interlayers, while the density of the warp and of the weft of the substrate for layer X is larger than that of the substrate for the interlayers. The other outer layer (layer Y) opposite layer X is of a substrate made of spun yarn having a smaller yarn count than that of the spun yarn constituting the substrate for the interlayers, and that these substrate layers are laminated in the defined order. More specifically, for the interlayers and the layer X of the substrates, the warp should be of spun yarn of from #10 to #30, and the weft should be of spun yarn of from #50 to #70, and that, in the substrate for the layer Y, the warp and the weft should both be of spun yarn of #10 to #30.

In general, in blankets, the dimensional change in the substrate layers remote from the surface rubber layer is larger. The blanket substrate of the invention exhibits excellent dimensional stability. Therefore, in the blanket of the invention, at least the outermost layer, i.e., the layer which is the most remote from the surface rubber layer, should be of the substrate of the invention.

Needless-to-say, the blanket of the invention may have any additional layers besides the substrate layers and the surface rubber layer. For example, it may have a compressible layer of sponge or the like. The interlayer adhesive should be a liquid substance such as nitrile rubber, chloroprene rubber or the like. The substrate may be processed in order to enhance its adhesiveness to other layers.

In order to laminate the surface rubber layer to the substrate, for example, a natural rubber, chloroprene rubber, nitrile rubber, vulcanized rubber, polyurethane rubber, fluorine rubber, acrylic rubber, hydrin rubber, or the like should be employed. In view of the printing characteristics of the blanket, nitrile rubber is especially preferred. If desired, additives of a vulcanizing agent, a vulcanization promoter and the like may be added to the rubber for the rubber layer.

The method of laminating the rubber layer to the substrate layers is not specifically limited. For example, a calender roll may be used for the lamination. As the case may be a solution of rubber may be applied onto the laminate of substrate layers. In that case, the rubber solution may be applied onto the laminate of substrate layers by the use of a knife cater, a roll cater or the like, thereby forming the surface rubber layer on the laminate of substrate layers. The rubber layer thus laminated should have a unit weight of from 100–1000 g/m$^2$ or so. After having been laminated in this manner, the rubber layer may be vulcanized to complete the blanket.

The blanket of the invention is applicable to any and every type of printing, but is preferably used in offset printing.

Having now generally described the invention, a further understanding can be obtained by reference to certain specific Examples which are provided herein for purpose of illustration only and are not intended to be limiting unless otherwise specified.

Degree of Polymerization of PVA

According to the procedure of JIS K6726, the limiting viscosity [η] of an aqueous solution of PVA at 30° C. is measured. From the value measured, the degree of polymerization of PVA, as $\log P = 1.63\log([\eta]\times10^4/8.29)$ in which P is the mean degree of polymerization of PVA, is obtained.

Tensile Strength (g/d), Elongation at Break (%). and Young's Modulus (g/d) of Fibers According to the procedure of JIS L1013, a 20-cm sample of fibers having been previously conditioned for moisture content is tested at a deformation rate of 50%/min under an initial load of 0.1 g/dr for its physical properties of tensile strength, elongation at break and Young's modulus.

Width, Depth and Length of Primary Ridged Streaks, and Width, Depth and Length of Secondary Ridged Streaks on the Surface of Fibers Using a sheet film of polyethyl methacrylate, a one-stage molding replica of the surface of fibers under the condition of 120° C./0.8 kg/cm$^2$ is formed. This is shadowed through vacuum vapor deposition with a platinum-palladium alloy, at an angle of tan θ=0.7 in the direction perpendicular to the fiber axis. The shadowed replica is reinforced by vacuum depositing carbon thereon in the direction perpendicular to the fiber axis and the film surface and then the polyethyl methacrylate carbon is deposited thereover at the top of the replica, also through vacuum vapor deposition, and the carbon is reinforced. The sheet film of polyethyl methacrylate film is dissolved. The 2-stage replica thus prepared is held on a sheet mesh and photographed with a transmission-type election photomicrographer at a magnification of 5,000. Measurement of the fine, ridged streaks on the surface of the fibers is made on the reversed print (×30000) of the picture. The depth of the streaks is obtained, based on the angle for the shadowing.

Cross-section Circularity, %

In the electromicrophotographic picture, which shows the cross-section of fibers, the cross-section circularity of the fibers, B/A×100 is obtained, wherein A indicates the area of the minimum circumscribed circle around the cross-section of the fiber, and B indicates the area of the cross-section of the fiber.

U %

U % indicates the percentage of the mean unevenness deviation of yarn, which is determined by method A for fiber unevenness in JIS-L-1095 (test method for, ordinary spun yarn).

Constitution of Woven Fabrics

A: One fabric embodiment is a plain weave, in which the warp is of twisted yarn of two #20 spun yarns and its density is 50/in, and the weft is of single #20 spun yarn and its density is 50/in.

B: Another fabric embodiment is a plain weaves, in which the warp is of twisted yarn of four #60 spun yarns and its density is 65/in, and the weft is of single #30 spun yarn and its density is 65/in.

C: Still another embodiment is a plain weave, in which the warp is of twisted yarn of two #60 spun yarns and its density is 110/in, and the weft is of single #30 spun yarn and its density is 75/in.

Tensile Strength at Break of Fabric in the Warp Direction, g/d

The tensile tenacity at break of a fabric (g/cm) in the warp direction is divided by the fiber denier (d/cm) which corresponds to the total thickness of the warp existing in 1 cm-width in the warp direction of the fabric, thereby obtaining the tensile strength at break of the fabric in the warp direction (g/d). The tensile tenacity at break of a fabric is obtained according to JIS-L-1096 for the test method of ordinary woven fabric.

Stress of Fabric in 2% Elongation in the Warp Direction, g/d

The stress per 1 cm in width of fabric in 2% elongation, which is obtained from the tension-load curve of the fabric, is divided by the fiber denier that corresponds to the total thickness of the warp existing in 1 cm-width in the warp direction of the fabric, thereby obtaining the stress of the fabric in 2% elongation in the warp direction (g/d). The tension-load curve of fabric is obtained according to JIS-L-1096 for the test method of ordinary woven fabric.

Degree of Thermal Shrinkage at 150° C. of Fabric in the Warp Direction, %

A fabric is left in a hot air oven at 150° C. under no tension for 15 minutes, and the length of the dimensional shrinkage in the warp direction is measured. The length of shrinkage is divided by the original length of the non-treated fabric to obtain the percentage of thermal shrinkage (%) of the fabric.

Dimensional Stability

A blanket is set in an offset printer, which is run to give about 100 test prints. Then, the printer is continuously run under the same condition as that for the test prints. The continuous printing gives 1000 prints. The prints are checked for image gaps, if any, therein, on the basis of which the blanket is evaluated. If the blanket used is elongated, the prints shall have image gaps. The dimensional stability of blankets tested is represented by A (for good blankets that gave prints all with no image gaps) or C (for bad blankets that gave some prints with image gaps).

Uniformity in Thickness

A blanket is set in an offset printer, which is continuously run under the same condition as that for the test prints above. Continuous printing gives 1000 prints. The prints are checked with the naked eye and through a loupe for the details, which are the condition of the dots and the presence or absence of any defective parts where the density of the images is not uniform. If the blanket used has some swollen defects, the density of the images shall be partly increased and the dots are enlarged. The printing is effected on Al-size paper. The uniformity in thickness of blankets tested is represented by A (for good blankets that gave prints all showing no significantly defective parts), B (for average blankets that gave some prints having from 1–3 defective parts), and C (for bad blankets that gave some prints having 4 or more defective parts).

Resistance of Cyclic Compression

A roll with a piece of embossed paper (size 1 cm×1 cm, thickness 0.1 mm) attached on its surface is pressed 100 times against the surface of a blanket, and the blanket is tested in continuous printing under the same conditions as that for the test prints above. The condition of the prints is checked for change, if any. The prints obtained by the use of the blanket of the invention are compared with those obtained by the use of a comparative blanket having a cotton substrate, on the basis of which the resistance of the cyclic compression of the blanket tested is evaluated. If the blanket used has lost its resistance of cyclic compression in some parts, the density of the images printed is usually partially thin and the images are partially whitened. The resistance of cyclic compression of blankets tested is represented by A (for good blankets of which the resistance of cyclic compression <image whitening resistance> that of the comparative cotton blanket), B (for average blankets of which the resistance of cyclic compression is comparable to that of the comparative cotton blanket), and C (for bad blankets of which the resistance of cyclic compression is worse than that of the comparative cotton blanket). The comparative cotton blanket used is one as prepared in Comparative Example 8.

Adhesiveness to Rubber (Peeling-resistant Tenacity), kg/in

Blankets were produced in the same method as described in Example 7, and subjected to the T-type peeling test of JIS K6323 for "rubber-laminated fabrics". In the test, the peeling resistant tenacity between the fabric layer and the rubber layer is measured.

Reference Examples 1–3

PVA having a viscosity-average degree of polymerization of 1700 and a saponification degree of 99.8 mol. % was added to DMSO on a 10% by weight basis and dissolved therein at 90° C. for 8 hours in a nitrogen atmosphere, and the resulting solution was wet-spun into a coagulation bath of methanol/DMSO=70/30 by weight at 5° C. through a circular nozzle with 1000 orifices each having a diameter of 0.08 mm. The resulting, solidified fibers were drawn to a total drawing ratio of 4 times in a wet-drawing bath of methanol/DMDO=95/5 by weight at 40° C., then contacted with a countercurrent flow of methanol to remove DMSO therefrom through extraction, then dried in a hot air drier, and then drawn under heat in a hot air furnace at 240° C. The total drawing ratio was 17 times. An oiling agent was applied to the fibers, which were then dried. A fiber tow was obtained.

The fibers obtained herein had a single fiber denier of 1.0 d, a strength of 14.5 g/dr, a degree of elongation at break of 5.1%, a Young's modulus of 298 g/d, and a cross-section circularity of 100%. The cross-section profile of the fibers was substantially completely round.

The surface of the fibers was observed with an electron microscope according to the replica method. The primary ridged streaks found on their surface had a width ranging from 0.2–0.9 $\mu$m, a depth ranging from 0.1–0.2 $\mu$m and a length of at least 50 $\mu$m. The width and the depth of the secondary ridged streaks also found thereon were both from 0.02–0.3 $\mu$m, and the length thereof was at least 0.05 $\mu$m.

The fiber tow was crimped under heat, and then cut into fiber pieces having a length of 38 mm. These pieces are then spun into spun yarn. The fibers had high quality with no interfiber sticking served.

The fibers were spun according to a cotton-spinning method into #20 spun yarn (Reference Example 1, having a mean tenacity of 1354 gf, a mean strength of 5.1 g/d, a mean elongation of 9.2%, and U % of 9.2), #30 spun yarn (Reference Example 2, having a mean tenacity of 886 gf, a mean strength of 5.0 g/d, a mean elongation of 8.2%, and U % of 11.1), and #60 spun yarn (Reference Example 3, having a mean tenacity of 435 gf, a mean strength of 4.9 g/d, a mean elongation of 7.0%, and U % of 12.1).

Reference Example 4

The same process as described in Reference Example 1 was repeated, except that the spinning solution of aqueous PVA was jetted into a bath of Glauber's salt to prepare PVA based fibers (Kuraray's "1005C20/1").

The fibers obtained herein had a single fiber denier of 1.0 d, a strength of 7 g/dr, a degree of elongation at break of 13.5%, a Young's modulus of 180 g/d, and a cross-section circularity of 30%. The cross-section of the fibers had a cocoon-like profile. The surface of the fibers was observed with an electronimicroscope according to the replica method. Neither primary ridged streaks nor secondary ridged streaks were found.

The fibers were spun according to the same cotton-spinning method as described in Reference Example 1, into #20 spun yarn. Regarding its properties, the resulting #20 spun yarn bad a mean tenacity of 850 gf, a mean strength of 3.2 g/d, a mean elongation of 16.0%, and U % of 16.0. The fibers were observed to partly stick to each other, and their quality was poor.

Reference Example 5, Reference Example 6

The same process as described in Reference Example 1 was repeated, except that PVA based fibers of Kuraray's "1006C20/1" were used.

The fibers used had a single fiber denier of 1.0 d, a strength of 9.8 g/dr, a degree of elongation at break of 11%, a Young's modulus of 130 g/d, and a cross-section circularity of 30%. The cross-section of the fibers had a cocoon-like profile. The surface of the fibers was observed with an electron microscope according to the replica method. Neither primary ridged streaks nor secondary ridged streaks were found.

The fibers were spun according to the same cotton-spinning method as described in Reference Example 1, into #30 spun yarn (Reference Example 5) and #60 spun yarn (Reference Example 6). Regarding their properties, the #30 spun yarn had a mean tenacity of 1400 gf, a mean strength of 5.6 g/d, a mean elongation of 10.0%, and U % of 11, and the #60 spun yarn had a mean tenacity of 720 gf, a mean strength of 5.2 g/d, a mean elongation of 9.5%, and U % of 12.3.

Reference Examples 7, 8, 9

In the same manner as described in Reference Example 1 except that Egyptian cotton was used in place of the PVA based fibers, prepared were #20, #30 and #60 spun yarns. Regarding their properties, the #20 spun yarn had a mean tenacity of 770 gf, a mean strength of 3.0 g/d, a mean elongation of 9%, and U % of 9.0, the #30 spun yarn had a mean tenacity of 570 gf, a mean strength of 2.9 g/d, a mean elongation of 8.3%, and U % of 9.8, and the #60 spun yarn had a mean tenacity of 290 gf, a mean strength of 2.7 g/d, a mean elongation of 7.6%, and U % of 10.5.

EXAMPLES 1–6

Comparative Examples 1–6

Using the spun yarns obtained as described above, plain weaves were prepared as shown in Table 1 below. Next, the fabrics were subjected to a thermal fixation treatment under the conditions shown in Table 1 to produce blanket substrates.

The dry heat treatment and the stretching treatment both at 210° C. were accomplished by passing the blanket as held between two rubber rolls under tension through a hot air furnace over a period of 2 minutes. The thermal fixation treatment was done under mild tension. The test data are shown in Table 1.

EXAMPLE 7

Two blanket substrates as produced in Example 2 were bonded with a nitrile rubber-type adhesive, and vulcanized under heat at 150° C. to prepare a laminate. One blanket substrate as produced in Example 3 was laminated on one surface of the laminate (over this substrate, a surface rubber layer is laminated), and then vulcanized under heat in the same manner as described above. Next, one blanket as produced in Example 1 was laminated on the other surface of the laminate (this surface is opposite to that which is to be laminated with a surface rubber layer), and vulcanized under heat also in the same manner described above. Thus was obtained a substrate layer of a laminate of four blanket substrates. Next, a nitrile rubber solution was repeatedly applied onto the surface of the substrate layer, and then vulcanized under heat at 150° C. to form a surface rubber layer thereon. A blanket was thusly prepared.

The blanket produced herein had a grade A with respect to dimensional stability, resistance of cyclic compression and thickness uniformity. In addition, the adhesiveness of the substrate layer to the rubber layer was 6.0 kg/cm and was high. It is known that the properties of the blanket are extremely good. After the dimensional stability test, the blanket was subjected to a continuous printing test. In the continuous printing test, the dimensional stability of the blanket of this Example was much better than that of the cotton blanket of Comparative Example 8 described below. The prints obtained by the use of the blanket of this Example all had no image gaps.

EXAMPLE 8

A blanket was produced in the same manner described in Example 7, except that the substrate of Example 4 was used in place of that of Example 1, the substrate of Example 5 was used in place of that of Example 2, and the substrate of Example 6 was used in place of that of Example 3.

The blanket produced herein was on grade A with respect to both the dimensional stability and thickness uniformity, and on grade B with respect to the resistance of cyclic compression. In addition, the adhesiveness of the substrate layer to the rubber layer was 6.0 kg/cm and was high. It is known that the properties of the blanket are extremely good.

Comparative Example 7

A blanket was produced in the same manner described in Example 7, except that the substrate of Comparative Example 1 was used in place of that of Example 1, the substrate of Comparative Example 2 was used in place of that of Example 2, and the substrate of Comparative Example 3 was used in place of that of Example 3.

The dimensional stability, the thickness uniformity and the resistance of cyclic compression of the blanket produced herein were all not good, all characterized by grade C. In addition, the adhesiveness of the substrate layer to the rubber layer was 4.5 kg/cm and was less than that in Examples.

Comparative Example 8

A blanket was produced in the same manner described in Example 7, except that the substrate of Comparative Example 4 was used in place of that of Example 1, the substrate of Comparative Example 5 was used in place of that of Example 2, and the substrate of Comparative Example 6 was used in place of that of Example 3.

The dimensional stability of the blanket produced herein was on level A, but the uniformity in thickness and the resistance of cyclic compression thereof were both on level B. In addition, the adhesiveness of the substrate layer to the rubber layer was 4.5 kg/cm and was less than that in the Examples.

TABLE 1

| | Ex. 1 | Ex. 2 | Ex. 3 | Ex. 4 | Ex. 5 | Ex. 6 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|---|---|
| Yarn Used | Ref. Ex. 1 | Ref. Ex. 2 Ref. Ex. 3 | Ref. Ex. 2 Ref. Ex. 3 | Ref. Ex. 1 | Ref. Ex. 2 Ref. Ex. 3 | Ref. Ex. 2 Ref. Ex. 3 | Ref. Ex. 4 | Ref. Ex. 5 Ref. Ex. 6 | Ref. Ex. 5 Ref. Ex. 6 | Ref. Ex. 7 | Ref. Ex. 8 Ref. Ex. 9 | Ref. Ex. 8 Ref. Ex. 9 |
| Constitution of Fabric | A | B | C | A | B | C | A | B | C | A | B | C |
| Temperature of Dry heat Treatment (° C.) | 210 | 210 | 210 | room temp. | room temp. | room temp. | 210 | 210 | 210 | wet 40 | wet 40 | wet 40 |
| Degree of Stretching (%) | 12 | 12 | 12 | 7 | 7 | 7 | 12 | 12 | 12 | 12 | 12 | 12 |
| Temperature of Thermal Fixation Treatment (° C.) | 180 | 180 | 180 | 150 | 150 | 150 | 180 | 180 | 180 | 150 | 150 | 150 |

TABLE 1-continued

| | Ex. 1 | Ex. 2 | Ex. 3 | Ex. 4 | Ex. 5 | Ex. 6 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|---|---|
| Tensile Tenacity of Fabric (kg/cm) | 82.3 | 71.3 | 49.3 | 79.0 | 69.7 | 47.8 | 60.3 | 52.2 | 36.6 | 38.9 | 33.5 | 22.4 |
| Strength at Break of Fabric (g./d) | 6.5 | 6.4 | 6.4 | 6.5 | 6.4 | 6.4 | 4.8 | 4.7 | 4.7 | 3.1 | 3.0 | 3.0 |
| Stress in 2% Elongation (g/d) | 1.6 | 1.5 | 1.3 | 1.4 | 1.3 | 1.2 | 0.9 | 0.8 | 0.8 | 1.3 | 1.2 | 1.2 |
| Degree of Thermal Shrinkage (%) | 0.4 | 0.4 | 0.3 | 0.8 | 0.7 | 0.6 | 0.9 | 0.8 | 0.8 | 0.4 | 0.4 | 0.4 |

The disclosures of Japanese Application Numbers 123215/98 and 88358/99 filed May 6, 1998 and Mar. 30, 1999, respectively are hereby incorporated by reference into the present application.

Obviously, numerous modifications and variations of the present invention are possible in light of the above teachings. It is, therefore, to be understood that within the scope of the appended claims, the invention may be practiced otherwise than as specifically described herein.

What is claimed as new and is intended to be secured by Letters Patent is:

1. A blanket substrate substratum fabric, comprising:

a woven fabric prepared from spun yarn of PVA based fibers in the wrap and weft direction of the fibers, wherein the spun yarn comprises fibers having primary ridged streaks which are formed on the surfaces in the direction of the fiber axes with finer secondary ridged streaks formed in the primary ridged streaks, the fibers having a cross-section circularity of at least 80%, and wherein, in the process of preparing the blanket substratum, a substrate is stretched to a degree of at least 5% in the wrap direction followed by thermally fixing the substrate at a temperature of 130° or higher in combination with dry thermally treating the fixed substrate at a temperature ranging from 100–230° C.

2. The blanket substratum fabric as claimed in claim 1, wherein the width of the primary ridged streaks on the surface of the polyvinyl alcohol based fibers ranges from 0.1–2 $\mu$m, the height ranges from 0.05–0.4 $\mu$m, and the length is at least 5 $\mu$m.

3. The blanket substratum fabric as claimed in claim 1, wherein the width of the secondary ridged streaks on the surface of the polyvinyl alcohol based fibers ranges from 0.01–0.05 $\mu$m, and the height ranges from 0.01–0.05 $\mu$m.

4. The blanket substratum fabric as claimed in claim 1, which has a tensile strength at break in the warp direction of at least 4 g/d, and a degree of stress of at least 1 g/d when 2% elongated in the warp direction.

5. The blanket substratum fabric as claimed in claim 4, which has a tensile strength at break in the warp direction of at least 6 g/d, and a degree of stress of at least 1.2 g/d when 2% elongated in the warp direction.

6. The blanket substratum fabric as claimed in claim 1, which has a degree of thermal shrinkage at 150° C. in the warp direction of at most 2%.

7. The blanket substratum fabric as claimed in claim 6, wherein the degree of thermal shrinkage at 150° C. in the warp direction is 0–0.5%.

8. The blanket substratum fabric as claimed in claim 1, wherein the strength of the polyvinyl alcohol based fibers is at least 8 g/d, and the Young's modulus thereof is at least 180 g/d.

9. The blanket substratum fabric as claimed in claim 8, wherein the strength of the polyvinyl alcohol based fibers is at least 12 g/d, and the Young's modulus thereof is at least 250 g/d.

10. The blanket substratum fabric as claimed in claim 1, wherein the polyvinyl alcohol of the fibers has a mean degree of polymerization of at least 500.

11. The blanket substratum fabric as claimed in claim 1, wherein the saponification degree of the polyvinyl alcohol of the fibers is at least 98.5%.

12. A laminated blanket whose surface layer is a rubber layer bonded to a plurality of substrate layers of which one is a blanket substratum fabric which is the blanket substratum fabric of claim 1.

* * * * *

UNITED STATES PATENT AND TRADEMARK OFFICE

CERTIFICATE OF CORRECTION

PATENT NO. : 6,500,776 B2
DATED : December 31, 2002
INVENTOR(S) : Hamada et al.

It is certified that error appears in the above-identified patent and that said Letters Patent is hereby corrected as shown below:

Title page,
Item [45] and the Notice information should read as follows:

-- [45] **Date of Patent: *Dec. 31, 2002**

[*] Notice: This patent issued on a continued prosecution application filed under 37 CFR 1.53(d), and is subject to the twenty year patent term provisions of 35 U.S.C 154(a)(2).

Subject to any disclaimer, the term of this patent is extended or adjusted under 35 U.S.C. 154(b) by 0 days. --

Signed and Sealed this

Twentieth Day of May, 2003

JAMES E. ROGAN
*Director of the United States Patent and Trademark Office*